US006063509A

United States Patent [19]

Hudelmaier et al.

[11] Patent Number: 6,063,509

[45] Date of Patent: May 16, 2000

[54] REINFORCING COMPONENT OF WHICH THE BASIC MATERIAL IS AUSTENITIC CAST IRON

[75] Inventors: Birgit Hudelmaier, Esslingen; Dieter Mueller-Schwelling, Fellbach; Detlef Schlosser, Kirchheim, all of Germany

[73] Assignee: Mahle GmbH, Stuttgart, Germany

[21] Appl. No.: 09/051,051

[22] PCT Filed: Sep. 20, 1996

[86] PCT No.: PCT/DE96/01809

§ 371 Date: Mar. 31, 1998

§ 102(e) Date: Mar. 31, 1998

[87] PCT Pub. No.: WO97/13396

PCT Pub. Date: Apr. 17, 1997

[30] Foreign Application Priority Data

Oct. 11, 1995 [DE] Germany ........................... 195 37 848

[51] Int. Cl.[7] ........................... B32B 15/18; B32B 15/20; F02F 3/10; B22D 19/02; B22D 19/16

[52] U.S. Cl. ........................... 428/653; 148/512; 148/531; 148/902; 148/903; 29/888.047; 123/193.6

[58] Field of Search .................................... 428/614, 653, 428/610; 148/531, 512, 903, 902; 29/888.047; 164/100, 103, 98; 123/193.6

[56] References Cited

U.S. PATENT DOCUMENTS

| | | | |
|---|---|---|---|
| 4,025,366 | 5/1997 | Ruf et al. | 148/3 |
| 4,129,309 | 12/1978 | Köhnert et al. | 277/189.5 |
| 4,153,477 | 5/1979 | Beyer et al. | 148/1 |
| 4,365,399 | 12/1982 | Mahrus | 29/156.5 R |
| 4,435,226 | 3/1984 | Neuhauser et al. | 148/3 |
| 4,547,336 | 10/1985 | Mahrus et al. | 419/31 |
| 5,072,092 | 12/1991 | Richter et al. | 219/121.72 |
| 5,119,777 | 6/1992 | Mielke et al. | 123/193.6 |
| 5,851,014 | 12/1998 | Germann et al. | 277/406 |

FOREIGN PATENT DOCUMENTS

| | | |
|---|---|---|
| 3111098 | 1/1982 | Germany . |
| DD0154726 | 4/1982 | Germany . |
| 3418405 | 8/1988 | Germany . |
| 3801847 | 8/1988 | Germany . |
| 4010474 | 10/1991 | Germany . |
| 4221448 | 1/1994 | Germany . |
| 4325864 | 5/1995 | Germany . |
| 1569444 | 6/1990 | United Kingdom . |

OTHER PUBLICATIONS

Patent Abstracts of Japan vol. 016, No. 208, (C–0941), May 18, 1992 & JP 04 036417 A (Honda Motor) Feb. 6, 1992.

Patent Abstracts of Japan vol. 004, No. 057 (M–009), Apr. 26, 1980 & JP 55 024784 A (Mazda Motor), Feb. 22, 1980.

*Primary Examiner*—John J. Zimmerman
*Attorney, Agent, or Firm*—Collard & Roe, P.C.

[57] ABSTRACT

In a reinforcing component made from austenitic iron which is bonded intermetallically with an engine component made from an aluminium-base alloy, in particular a piston, the aim is to improve the strength of the bond irrespective of the graphite configuration in the base material. For that purpose, the structure at least on areas of the reinforcing component surface in the vicinity of the intermetallic bond is austenitic-ledeburitic.

8 Claims, 3 Drawing Sheets

REINFORCING COMPONENT OF WHICH THE BASIC MATERIAL IS AUSTENITIC CAST IRON

BACKGROUND OF THE INVENTION

1. Field of the Invention

The invention relates to a reinforcing component of which the basic material is austenitic cast iron and which is intermetallically bonded with an engine component made from an aluminum-based alloy, in particular a piston. Reinforcing components of this type are especially employed as ring carriers and in a few cases also as trough-edge protection in connection with aluminum pistons for Diesel engines.

The bond of the reinforcing component—which consists of austenitic grey cast iron alloy in most cases—with the material of the piston is produced by the Alfin-process, which is known in the state of the art since about 1950, by immersing the reinforcing component in an AlSi-melt before the piston material is poured around it, whereby an intermetallic layer develops on the surface of the reinforcing component.

2. The Prior Art

The stresses to which pistons are exposed in Diesel engines, which have continually increased in the past, have revealed the strength limits of alfin-bonds produced heretofore, so that a higher bonding strength is required.

Therefore, it was proposed in DE-OS 42 21 448 to employ austenitic cast iron with a globular or vermicular graphite configuration as reinforcing material, which improves the strength of the bond as compared to the usual grey cast iron alloy material with a lamellar graphite configuration.

The drawbacks of this solution include abandonment of a ring carrier material that has been successfully used for a long time, poorer workability, lower thermal conductivity and slightly poorer resistance to wear of the grey cast graphite material as compared to the grey cast iron alloy type. In addition, grey cast iron qraphite material is slightly more expensive than the grey cast iron alloy type.

SUMMARY OF THE INVENTION

The invention, therefore, deals with the problem of increasing the strength of reinforcing materials of the type specified above and also the reproducibility of the intermetallic bond irrespective of whether the basic material has a grey cast graphite or grey cast alloy graphite configuration.

This problem is solved by a reinforcing component of which the basic material is austenitic cast iron, and which is intermetallically bonded with an engine component made of an aluminum-based alloy, in particular a piston in which the structure of the surface of the reinforcing component is austenitic-ledeburitic at least in areas in the vicinity of the intermetallic bond.

Within the context of the present invention an austenitic-ledeburitic structure is understood to be one that is preferably obtained by remelting austenitic cast iron and where austenite and ledeburite are present next to each other.

Owing to the very fine austenitic-ledeburitic structure and the also very fine nonlamellar configuration of the graphite, a flawless intermetallic layer can develop when the reinforcing component is immersed in a melt bath based on Al. First tear-off tests showed that the tensile strength of the layer as defined by the invention can be increased by at least another 30% as compared to the intermetallic layer with a globular graphite configuration as known from DE-OS 42 21 448.

The surface of the reinforcing component in the zone of the intermetallic bond can be formed austenitic-ledeburitically by remelting it either wholly or in part areas, with ring carriers preferably in the vicinity of the back of the ring carrier.

The laser, the induction or the WIG (tungsten-inert-gas) process can be considered as processes for remelting the reinforcing material.

Hard ingot casting offers another possibility for producing reinforcing components from austenitic cast iron with an austenitic-ledeburitic surface. With ring carriers, however, the problem is that such carriers no longer can be manufactured by the centrifugal casting process, and that due to the poor workability of ledeburite such ring carriers cannot be manufactured as usual by cutting them from cast sleeves but have to be additionally treated by separation and precision grinding, or they have to be cast individually.

BRIEF DESCRIPTION OF THE DRAWINGS

Other objects and features of the present invention become apparent from the following detailed description considered in conjunction with the accompanying drawings which disclose an exemplified embodiment of the present invention. It should be understood, however, that the drawings are designed for the purpose of illustration only, not as a definition of the limits of the invention.

In the following drawings, similar reference characters denote similar elements throughout the several views.

DETAILED DESCRIPTION OF PREFERRED EMBODIMENTS

Figure 1:
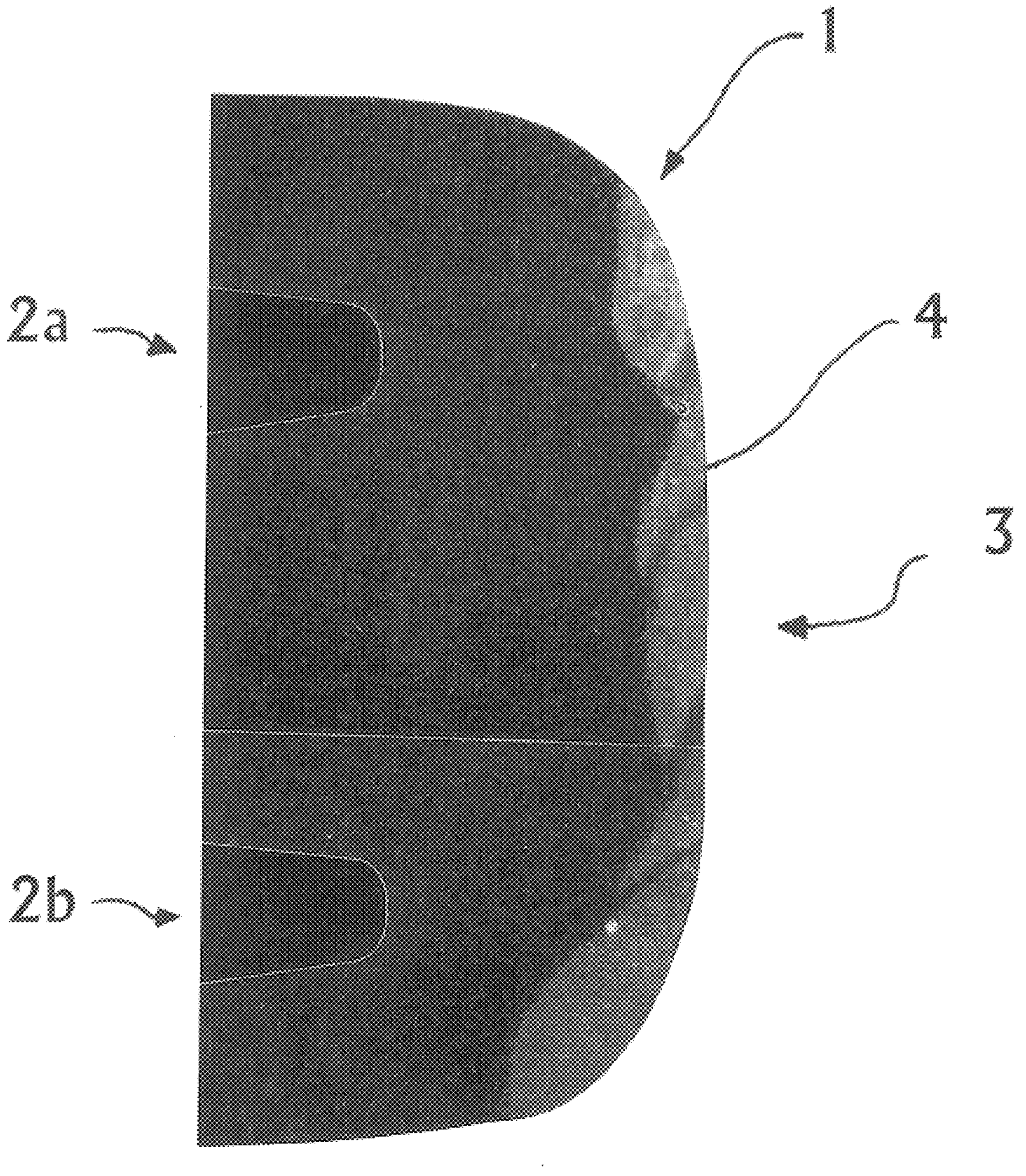
FIG. 1 shows a ring carrier with an austenitic-ledeburitically remelted ring carrier back ground crosswise.
Figure 2:
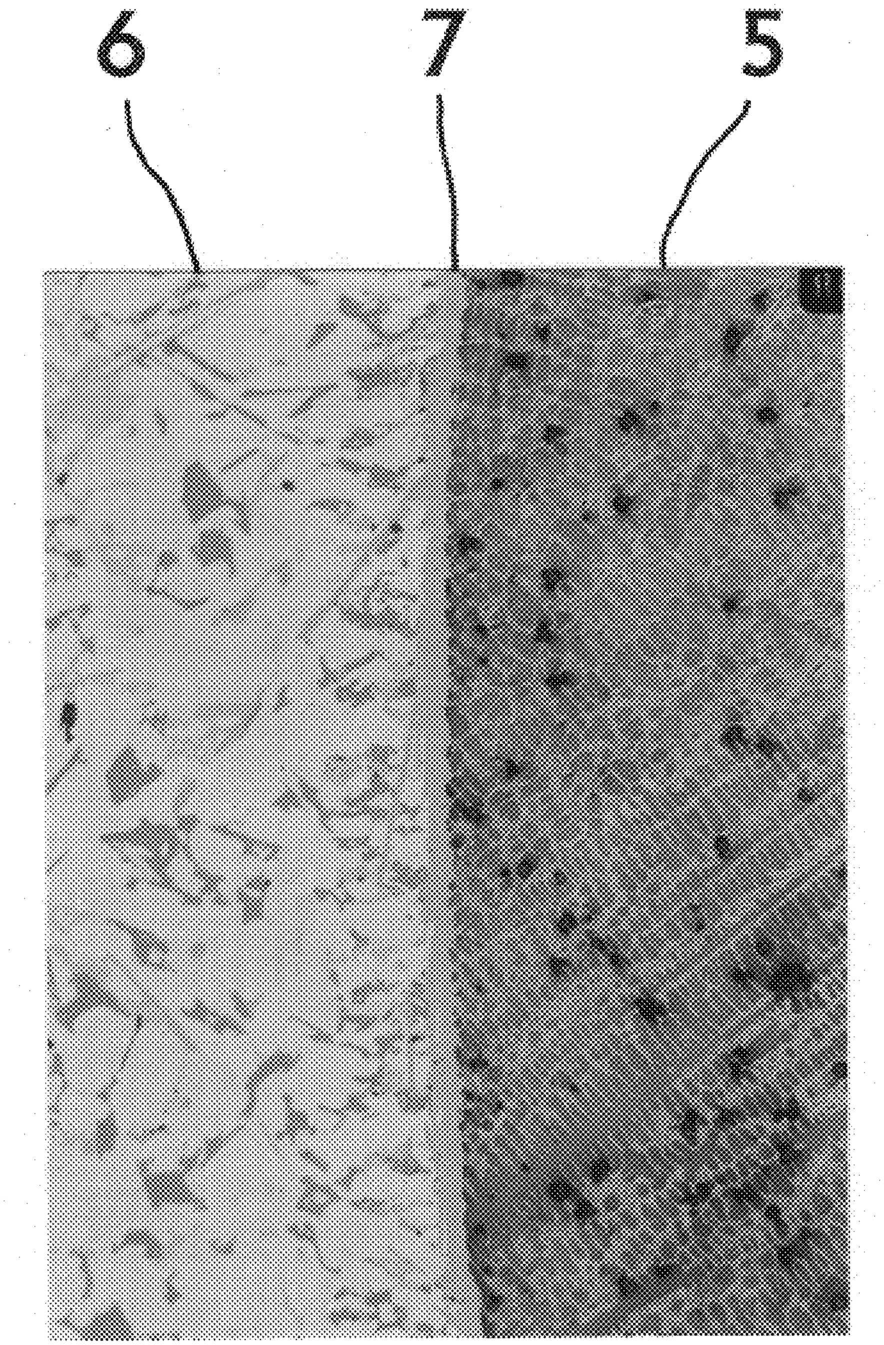
FIG. 2 shows the development of the structure within the zone of the intermetallic bond.
Figure 3:
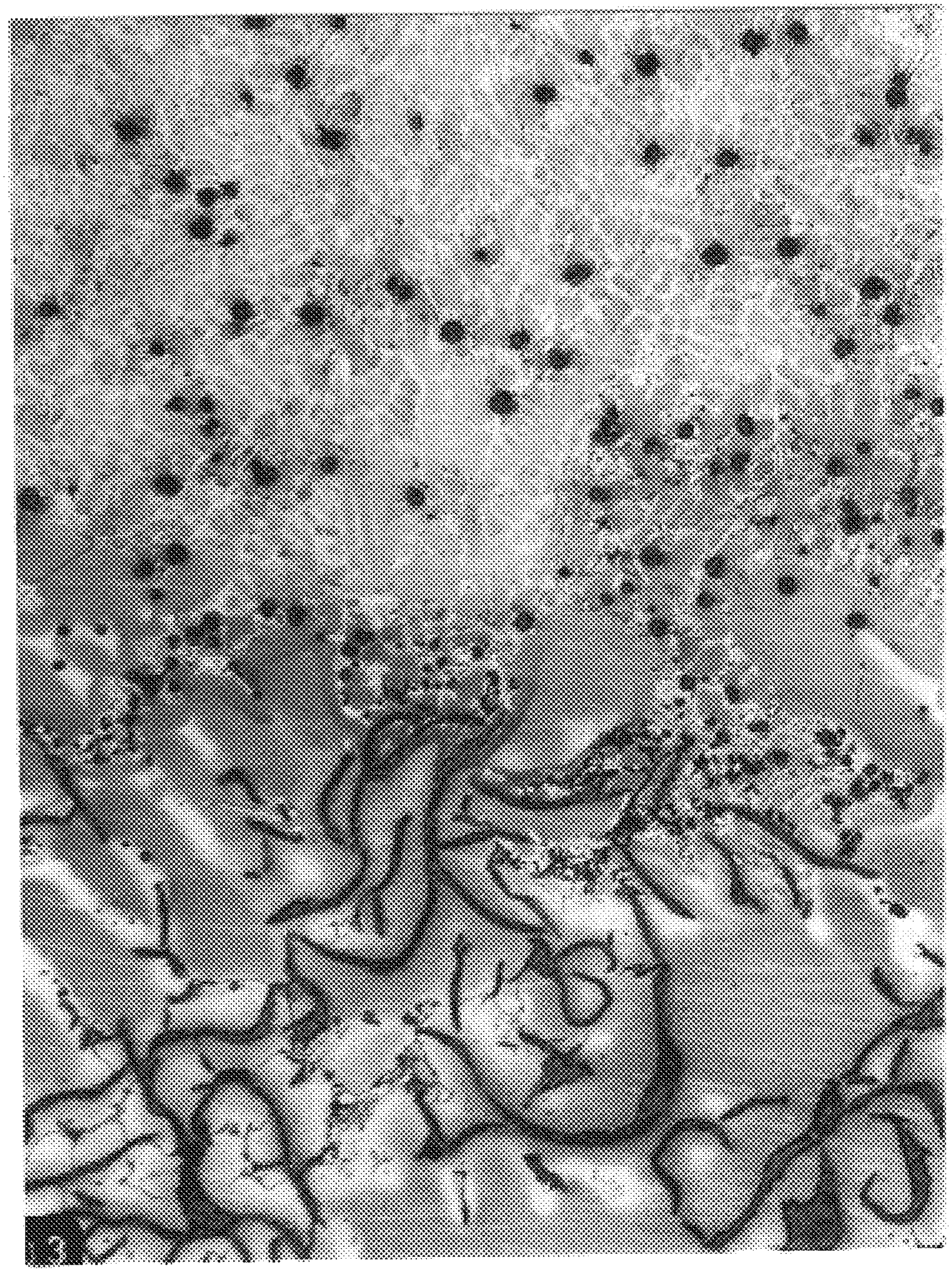
FIG. 3 shows the transition between the austenitic-ledeburitic remelt zone and the austenitic basic material with lamellar graphite.

FIGS. 1–3 are three micrographs illustrating the invention. A ring carrier 1 with two ring grooves 2*a* and 2*b* each receiving a piston ring has an austenitic-ledeburitic remelt zone 4 produced on back 3 of the ring carrier by WIG-remelting. The ring carrier material consists of grey cast iron alloy NiCuCr 15 6 2 with about 2.6% C, 2.1% Si, 1.2% Mn, 15% Ni, 1.5% Cr, and 6% Cu, the balance Fe (percentages are in weight percent).

The ring carrier was alfinized in an AlSi-melt, placed in a casting mold, and the piston basic material AlSil2CuNiMg was poured around it while the alfin layer had not yet solidified.

FIG. 2 shows the structure in the vicinity of the intermetallic bond soformed. Finely distributed nonlamellar residual graphite is still present in the remelted austenitic-ledeburitic zone 5. It was found that the remelt zone is only very weakly magnetic, so that it can be assumed that a predominating proportion of austenite and a smaller proportion of ledeburite are present. This development of the remelt zone is favorable to the extent that the coefficient of thermal expansion of the remelt zone deviates only insignificantly from that of the base material, and that no stresses occur to that extent between the remelt zone and the base material.

Intermetallic bonding layer 7 is disposed on the boundary between remelt zone 5 and piston base material 6. This bonding layer has a distinctly increased bonding strength as compared to alfin layers known heretofore.

What is claimed is:

1. A reinforcing component of which the basic material is austenitic cast iron, and which is intermetallically bonded with an engine component made of an aluminum-based alloy, characterized in that the structure of the surface of the reinforcing component (1) is austenitic-ledeburitic at least in a part area (3) disposed in the vicinity of the intermetallic bond.

2. The reinforcing component according to claim 1, characterized in that the structure is austenitic-ledeburitic on the total surface of the reinforcing component (1) in the vicinity of the intermetallic bond.

3. The reinforcing component according to claim 1, characterized in that the reinforcing component (1) is a ring carrier (1) for receiving a piston ring.

4. The reinforcing component according to claim 1, characterized in that the reinforcing component is a trough edge protection.

5. A process for producing a reinforcing component according to claim 1, characterized in that the austenitic-ledeburitic structure is obtained by remelting the austenitic basic material by means of laser beams.

6. The process for producing a reinforcing component according to claim 1, characterized in that the austenitic-ledeburitic structure is obtained by remelting the austenitic basic material by induction remelting.

7. The process for producing a reinforcing component according to claim 1, characterized in that the austenitic-ledeburitic structure is obtained by WIG-remelting.

8. The reinforcing component according to claim 1 wherein the engine component is a piston.

* * * * *